Patented June 9, 1925.

1,540,748

UNITED STATES PATENT OFFICE.

WALTER BAUER, OF DARMSTADT, GERMANY, ASSIGNOR TO RÖHM & HAAS AKTIEN-GESELLSCHAFT, OF DARMSTADT, GERMANY, A FIRM.

PROCESS OF MANUFACTURING ETHYLENE DIHALIDES.

No Drawing. Application filed April 26, 1922. Serial No. 556,765.

*To all whom it may concern:*

Be it known that I, WALTER BAUER, a citizen of the Free State of Schwarzburg-Sondershausen, in the German Republic, residing at Darmstadt, in the Free State of Hessia, Germany, have invented Improvements in the Processes of Manufacturing Ethylene Dihalides; and I do hereby declare the following to be a full, clear, and exact description of the same.

My invention relates to improvements in the process of manufacturing ethylene-dihalides.

Ethylene-dihalides are manufactured by causing a reaction of the halogens and ethylene. The symmetrical addition of hydrogen halide to acetylene, which is desirable by reason of the low cost of the said products, has heretofore not resulted in ethylene compounds.

I have discovered that the process is effectually carried out by combining acetylene and hydrogen halide in the presence of a small amount of another gas or vapor, the reaction being self-sustaining in that while it is carried out with rising temperature, there is no additional external application of energy to the reaction, and resulting in a good output in ethylene-dihalides.

I am aware that it has been proposed to manufacture hydrogen halide addition-compounds from acetylene and hydrogen halogen halide in the presence of an inert gas or liquid. However this process results in vinyl-compounds, that is addition-compounds comprising 1 molecule of halogen-hydrogen and 1 molecule of acetylene. In my improved process gas or vapor capable of entering into reaction, such as oxidizing compounds are used which produce symmetrical addition-products comprising two molecules of hydrogen halide and one molecule of acetylene, that is ethylene-compounds.

Suitable media causing the reaction are for example nitrogen-oxids, oxygen, atmospheric air, formaldehyde-vapors, and formic-acid vapors.

An important feature of the invention consists in that the reaction takes place after simply mixing the said components. Heating and otherwise treating the gaseous mixtures, which under certain conditions are explosive, are dispensed with. In some cases, however, it may be advisable to initiate the reaction by a gentle heat, and to remove the initiating heating agent as soon as the reaction is in full progress.

*Example 1.*—Through a reaction receptacle having a capacity of 60 litres I pass simultaneously and per hour, 1000 litres of acetylene, 2000 litres of hydrochloric-acid gas, and 60 litres of nitrogen-dioxid. A material increase of the temperature takes place, and ethylene-chlorid is formed at the ratio of 90% together with a little acetic acid and higher chlorine compounds.

*Example 2.*—Through a reaction receptacle of a capacity of 60 litres I pass per hour 1000 litres of acetylene, 2000 litres of hydrobromic-acid gas, and 10 litres of ozonized oxygen, while thoroughly mixing the gases. The temperature rises considerably and ethylene-bromid is formed having a boiling point of from 127 to 132 degrees, C., the output being from 85 to 90 per cent.

*Example 3.*—Through a reaction receptacle of a capacity of 60 litres I pass per hour 1000 litres of acetylene and 2000 litres of hydriodic-acid gas containing from 2 to 5 per cent of free iodine. By moderately heating the mixture the beginning of the reaction is accelerated. The product is ethylene-iodide having a melting point of from 80 to 81 degrees C. the output being from 65 to 70 per cent. The gas which has not entered into reaction is returned into the process.

Having now described and ascertained the nature of my invention and the manner in which the same is to be performed I now declare what I claim and desire to secure by Letters Patent of the United States:

1. The herein-described process of manufacturing ethylene dihalides, which consists in reacting acetylene and hydrogen halide in presence of a gaseous oxydizing substance.

2. The herein-described process of manufacturing ethylene dihalides, which consists in reacting acetylene and hydrogen halide in the presence of a gaseous oxydizing substance, and initiating the reaction by means of heat.

In testimony whereof, I have signed my name to this specification in the presence of two subscribing witnesses.

WALTER BAUER.

Witnesses:
EUGEN LETSCHE,
Dr. WALTER BOSSWENGER.